(12) United States Patent
Braun

(10) Patent No.: US 6,341,793 B2
(45) Date of Patent: *Jan. 29, 2002

(54) SELF-PROPELLED BOAT LAUNCH VEHICLE

(76) Inventor: Carl Braun, 4-319 Champlain Road, Penetanguishene, Ontario (CA), L9M 1S3

(*) Notice: Subject to any disclaimer, the term of this patent is extended or adjusted under 35 U.S.C. 154(b) by 0 days.

This patent is subject to a terminal disclaimer.

(21) Appl. No.: 09/828,814

(22) Filed: Apr. 10, 2001

Related U.S. Application Data

(63) Continuation-in-part of application No. 09/604,280, filed on Jun. 26, 2000, now abandoned, which is a continuation of application No. 09/395,977, filed on Sep. 15, 1999, now Pat. No. 6,079,729.

(30) Foreign Application Priority Data

Aug. 14, 2000 (CA) .............................................. 2315665

(51) Int. Cl.$^7$ ................................................. B60P 1/00
(52) U.S. Cl. ..................................... 280/414.1; 114/344
(58) Field of Search ........................ 280/414.1, 33.998; 180/14.2, 24.12; 114/344; 414/679, 482, 494, 559; 405/3–6

(56) References Cited

U.S. PATENT DOCUMENTS

| 4,210,218 A | 7/1980 | Oswald et al. |
| 5,123,799 A | 6/1992 | Breazeale |
| 5,228,713 A | 7/1993 | Kovach |
| 5,857,823 A | 1/1999 | MacEachern |

FOREIGN PATENT DOCUMENTS

| DE | 2315665 | 3/2001 |

*Primary Examiner*—Anne Marie Boehler
*Assistant Examiner*—Tony Winner
(74) *Attorney, Agent, or Firm*—Riches, McKenzie & Herbert LLP

(57) ABSTRACT

A launch vehicle for boats or other small watercraft which includes a partially submersible frame movably mounted on wheels. The wheels are provided with all-terrain type tires which enable the frame to move over rocks and uneven ground or lake beds, without becoming bogged down in muck or lake bed sediments. The frame supports a boat bunk configured to engagingly support the bottom sides of a boat hull thereon during its transportation and storage, as well as a walkway adapted to assume a generally horizontal orientation so as to enable a user to stand or rest thereon. The walkway has a lateral width of at least one foot, and extends substantially the longitudinal length of the boat launch vehicle. When horizontal, the walkway is positioned vertically spaced above the bunk at a location selected to locate above the lake surface of the lake when the bunk is sufficiently submerged to enable the boat to be floated free from or positioned over the bunk. The boat launch vehicle is self-propelled with the wheels rotatably driven by a motor mounted vertically above the submersible bunk so as to maintain it in position above the lake surface during boat launching and retrieval.

22 Claims, 11 Drawing Sheets

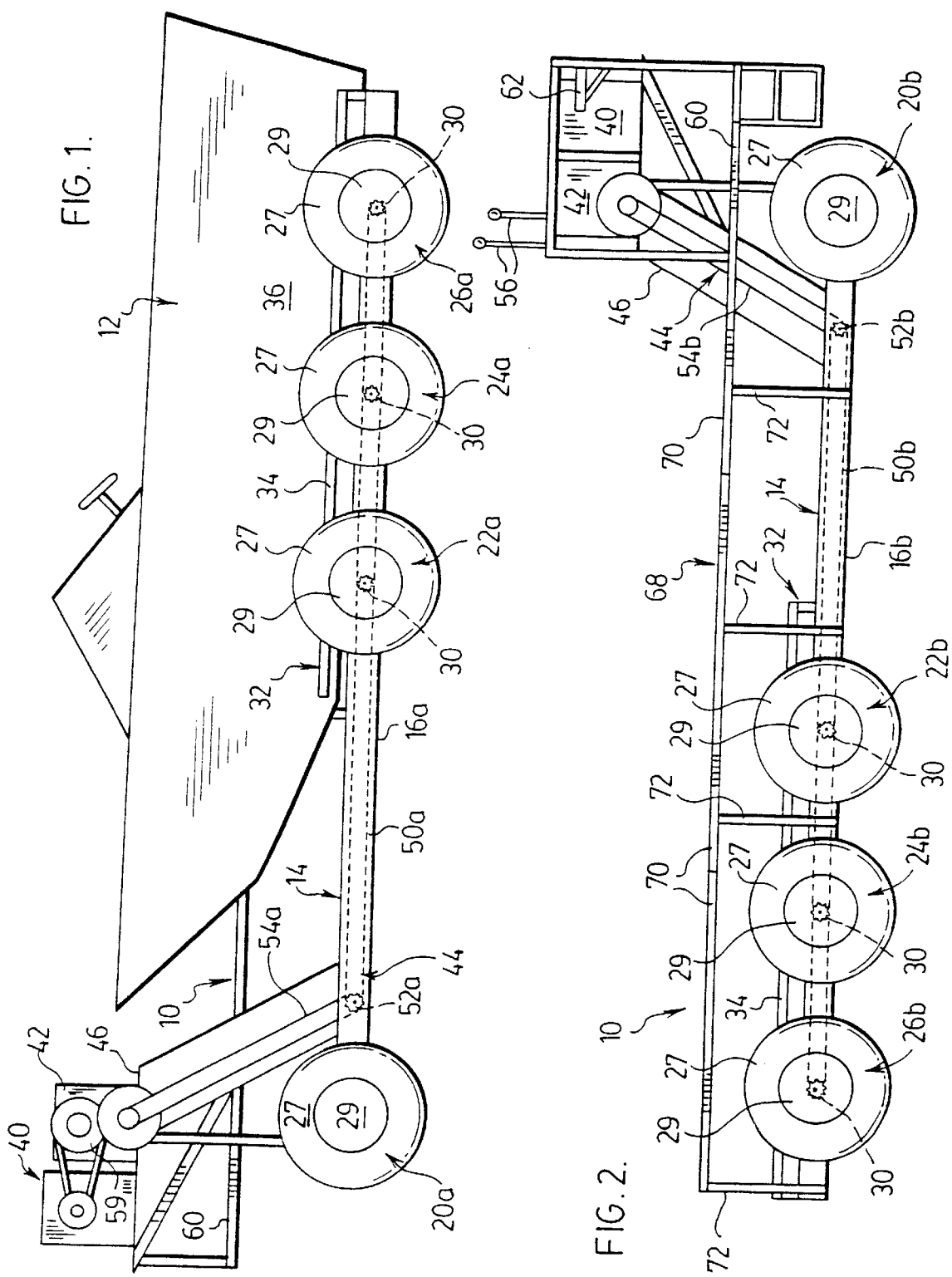

SELF-PROPELLED BOAT LAUNCH VEHICLE

RELATED APPLICATIONS

This application is a continuation-in-part of U.S. patent application Ser. No. 09/604,280, now abandoned which was filed Jun. 26, 2000 as a continuation of U.S. patent application Ser. No. 09/395,977 filed Sep. 15, 1999, now U.S. Pat. No. 6,079,729, issued Jun. 27, 2000.

SCOPE OF THE INVENTION

The present invention relates to a vehicle for use in transporting, storing and launching boats or other small watercraft, and more particularly to a self-propelled boat launch vehicle.

BACKGROUND OF THE INVENTION

The use of trailers in the transportation and launching of boats and other small watercraft is well known. Conventional boat trailers consist of a wheel supported metal frame upon which a crib or boat bunk is mounted to support the boat hull. Conventional trailers are provided with a hitch coupling at a front end which permits the trailer to be secured to a vehicle-mounted trailer hitch for transport. In launching a boat, with the hitch coupling secured to a vehicle, the rear end of the trailer is backed down a public or marina ramp until the boat bunk is submerged to a sufficient extent that the boat can be floated clear of the trailer. The empty trailer is then pulled from the lake and must be stored until such time as the boat is to be retrieved for transport elsewhere.

In addition to the expense and inconvenience of storage, conventional boat trailers suffer a disadvantage in that the combined weight of the boat and trailer typically necessitates that only larger vehicles, such as pick-up trucks or sport utility vehicles, may be used to transport and launch the boat from the trailer.

In addition, if the launch ramp is privately owned, users may be liable to pay launch fees for its use. Public launch ramps are frequently inconveniently located, acquiring that the boat be driven up to tens of miles to and from the boat launch site to its mooring. As a practical matter, when small watercraft and boats are moored at a dock, it often is not possible to safely pilot the watercraft over long distances to a public launch ramp for removal and sheltering during sudden storms.

In an effort to overcome at least some of the disadvantages associated with conventional boat trailers, various individuals have proposed boat railway systems which are designed to enable individuals to remove boats from lakes and rivers without the difficulties associated with trailers. Boat railway systems are unsightly, however, and involve the laying of parallel steel railroad rails on sleepers from a user's boat house a distance into the lake or river. Boats are raised and lowered from the lake by positioning the boat onto a wheeled sled and winching the sled along the rails. Railway systems are quite expensive and may cost thousands of dollars. In addition, if the railways are not removed from northern lakes and rivers each winter, they may be susceptible to ice damage and fouling by sedimentation. Permanent railway systems also require relatively constant water levels and may also be prohibited by building or environmental restrictions, or even bottom or surf conditions.

SUMMARY OF THE INVENTION

The present invention seeks to overcome at least some of the prior art disadvantages by providing a boat launching vehicle which is adapted to travel over uneven terrain to launch or retrieve a boat.

Another object of the invention is to provide a boat launch vehicle which is self-propelled and which may be used to either transport, store and/or launch boats and other small watercraft from a lake, river or other water body (collectively referred to as a lake).

A further object of the invention is to provide a self-propelled boat launch trailer which may be moved over sand, logs, rocks or uneven terrain to launch or remove a boat from a body of water.

A further object of the invention is to provide a partially submersible boat launch vehicle which provides a raised platform on which a boater may stand or walk when entering or exiting from a boat or small watercraft.

Another object of the invention is to provide a vehicle for launching and retrieving boats from lakes, which is adapted to travel over shoreline banks and/or lake beds, without requiring installation of specialized rail systems or permanent lift structures, and which optionally may be left partially submerged on a lake or river bed for a period of several months to function as a seasonal dock.

The present invention provides a launch vehicle for boats, jet skis or other small watercraft, and which hereafter are collectively referred to as boats. The launch vehicle includes a partially submersible frame which is movably mounted on wheels. The vehicle frame has a lateral width and longitudinal length selected to enable a boat to be supported thereon. Preferably the wheels are provided with all-terrain type tires which enable the frame to move over rocks and uneven ground or lake beds, without becoming bogged down in sand, muck or lake bed sediments. Although not essential, preferably the launch vehicle tires are of a low pressure design, and are typically inflated to pressures at or below 25 psi, and more preferably at or below 5 psi. Suitable tires would include those for use with ATV's or Argo™ amphibious vehicles. Optionally, tire-located tracks such as those described in Canadian Patent No. 1,215,735, and which issued Dec. 23, 1986, could be used where increased traction is desired.

The frame supports a boat cradle or bunk which is configured to engagingly support the bottom sides of a boat hull thereon during its transportation and storage. A walkway is also coupled to the frame. The walkway is adapted to assume a suitable orientation so as to enable a user to stand or rest thereon. Preferably, the walkway has a lateral width of at least one foot, and most preferably between 1 and 6 feet, and extends substantially the longitudinal length of the boat launch vehicle. If desired, the walkway optionally may be hingely coupled to a remainder of the launch vehicle so as to permit its movement between the generally horizontal orientation when used to support a boater, and an inclined or vertical storage position. When in the horizontal orientation, the walkway assumes a position vertically spaced above the bunk, and at a location selected so as to substantially locate above the surface of the lake when the bunk and lower portion of the frame are sufficiently submerged to enable the boat to be floated free from or positioned over the bunk.

The boat launch vehicle is self-propelled with the wheels rotatably driven by an electric AC or DC motor, or by a gasoline powered engine. The motor is mounted at a position vertically above the submersible bunk so as to maintain it in a position above the lake surface while the boat bunk is sufficiently submerged to permit the boat to float free of the vehicle during its launching, docking and retrieval. A drive link(age such as a direct drive, or a continuous loop-type drive including a drive belt or drive chain assembly transmits power from the motor to drive the wheels. Where a belt or chain drive is provided, an adjustable tensioning mechanism is preferably also provided to maintain sufficient tension thereon so as to substantially prevent chain or belt slippage. Most preferably, the drive motor is mounted on top of a vertically extending motor support located at a forward end of the launch vehicle. The motor support is most preferably positioned at an angle between 0 and 60° from the vertical in a direction away from the rear end of the vehicle. The motor support extends upwardly from the frame a distance of between approximately two and five feet, such that the motor is maintained at a position above the water surface adjacent at the shoreline during boat launching.

Boats are launched either prow first or essentially the same manner as with conventional boat trailers. To launch or retrieve the boat from the lake, the launch vehicle is moved into a lake so that part of the frame and the boat bunk moved to a sufficient extent to enable the boat to float free of the bunk. When launching the boat, the vehicle is moved into the water so that the bunk submerges and the forward end of the vehicle carrying the motor remains at or immediately adjacent to the shore line. As the vehicle enters the water, the frame partially submerges enabling the boat to float free of the bunk. Because the motor and the walkway are spaced vertically relative to the bunk, they are maintained substantially above the lake surface. As such, once the vehicle is partially submerged in water, the walkway permits the user access from the shore to the boat in a manner of a conventional dock.

The launch vehicle advantageously may be moved up onto the shore line daily, protecting the boat and vehicle from wave action, algae and corrosion. To remove the boat, the boat is moved over the submerged portion of the launch vehicle in essentially the same manner as with a conventional trailer, and is tethered in place directly above the bunk. The motor is then activated to drive the launch vehicle together with the boat from the lake. As the vehicle moves from the lake, the boat hull is positioned relative to the bunk and the launch vehicle may be housed for storage with the boat resting on the boat bunk. Alternately, the launch vehicle could be left partially submerged within the lake to act as a seasonal dock which can easily be removed from the lake upon the approach of severe storms and/or each fall to avoid winter ice damage.

In a preferred embodiment, the walkway may be mounted on one or more telescoping pipes or supports which permit the vertical adjustment of one or both ends of the walkway to better assume a position generally horizontally above the water surface. The walkway supports could in themselves be supported either entirely by the frame, or alternately adapted for engagement with the underlying lake bed to assist in anchoring or stabilizing the launch vehicle in a partially submerged position.

Accordingly, in one aspect the present invention resides in a self-propelled boat launch vehicle for launching or docking a boat in water comprising, a submersible longitudinally elongated frame, said frame being movably supported on each longitudinal side by a pair of low pressure tires inflated to a pressure of 25 psi or less, a submersible boat bunk mounted to said frame for supportably engaging said boat during launching, a drive motor supported at a position spaced vertically above said boat bunk, whereby during launching or docking of said boat, said drive motor is maintained at a position substantially above said waters, a continuous-loop drive member connecting said drive motor and at least one of said wheels, whereby the activation of the drive motor drives said at least one of said wheels to move the boat launch vehicle, and a walkway for supporting a user thereon being coupled to the frame.

In another aspect, the present invention resides in a boat launch vehicle for transporting, launching or docking a boat in water comprising, a generally planar frame, a submersible boat bunk mounted to said frame, and configured to engage and support said boat thereon during transport, said boat bunk including a pair of generally parallel and longitudinally extending side rails each extending from a first end to a second end, and wherein said side rails are pivotally coupled to said frame at a pivot so as to permit the second end of each of said rails to be lowered relative to said first end, a pair of low pressure tires movably supporting said frame, each said tire being inflatable to a pressure of 5 psi or less and being coupled to a respective longitudinal side rail of said frame, a drive motor selectively operable to drive said tires, said motor being supported at a position spaced a distance vertically above said boat bunk such that when said boat bunk is submerged during launching or docking of said boat, said drive motor is substantially maintained at a position above said water.

In a further aspect, the present invention resides in a self-propelled boat launch vehicle for transporting, launching or docking a boat in water comprising, a partially submersible longitudinally elongated frame, a submersible boat bunk mounted to said frame for supportably engaging said boat during transport or launching, a low pressure tire inflated to a pressure of 25 psi or less rotatably mounted to each side of said frame, a drive motor supported at a position vertically above said boat bunk such that when said boat bunk is submerged sufficiently to enable the boat to float free of the bunk, said drive motor is substantially maintained at a position above said waters, a drive linkage independently connecting said drive motor and said wheels, whereby the activation of the drive motor drives the boat launch vehicle in movement, and a generally planar walkway for supporting a user thereon extending substantially the longitudinal length of the frame, said walkway being coupled to said frame such that when said boat bunk is submerged sufficiently to enable the boat to float free of the bunk, the walkway is maintained in a position substantially above said water.

BRIEF DESCRIPTION OF THE DRAWINGS

Reference may now be had to the following detailed description taken together with he accompanying drawings in which:

FIG. 1 is a schematic first side view of a self-propelled boat launch vehicle in accordance with a preferred embodiment of the invention, showing a boat positioned thereon for transport;

FIG. 2 shows a schematic second side view of the boat launch vehicle of FIG. 1;

DETAILED DESCRIPTION OF THE INVENTION

Reference may be first had to FIGS. 1 to 4 which show a self-propelled boat launch vehicle 10 used in the transportation, storage, launching and/or docking of a boat 12, in accordance with a preferred embodiment of the invention.

Figure 3:
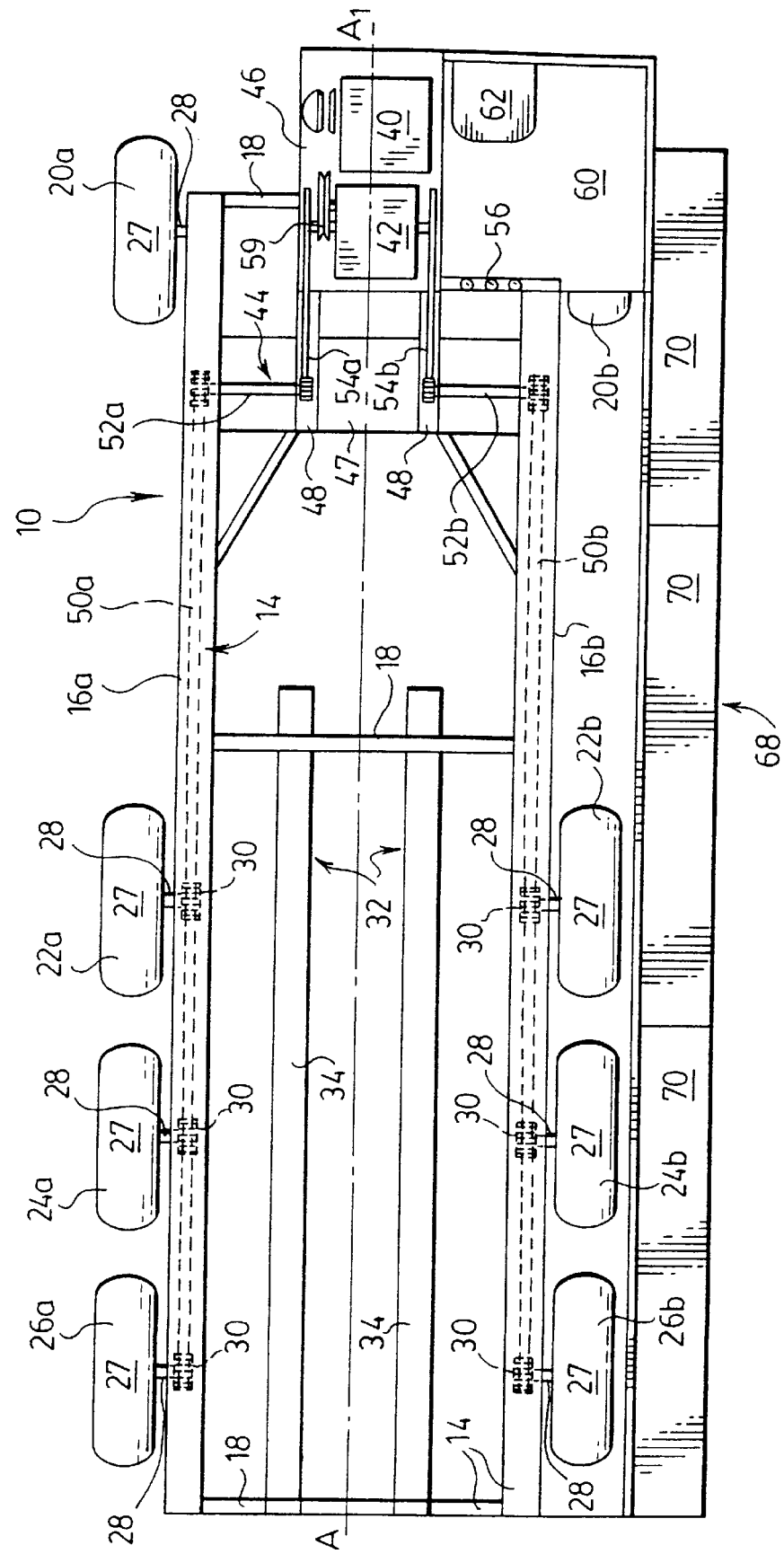
FIG. 3 shows a schematic plan view of the boat launch vehicle shown in FIG. 2.
Figure 4:
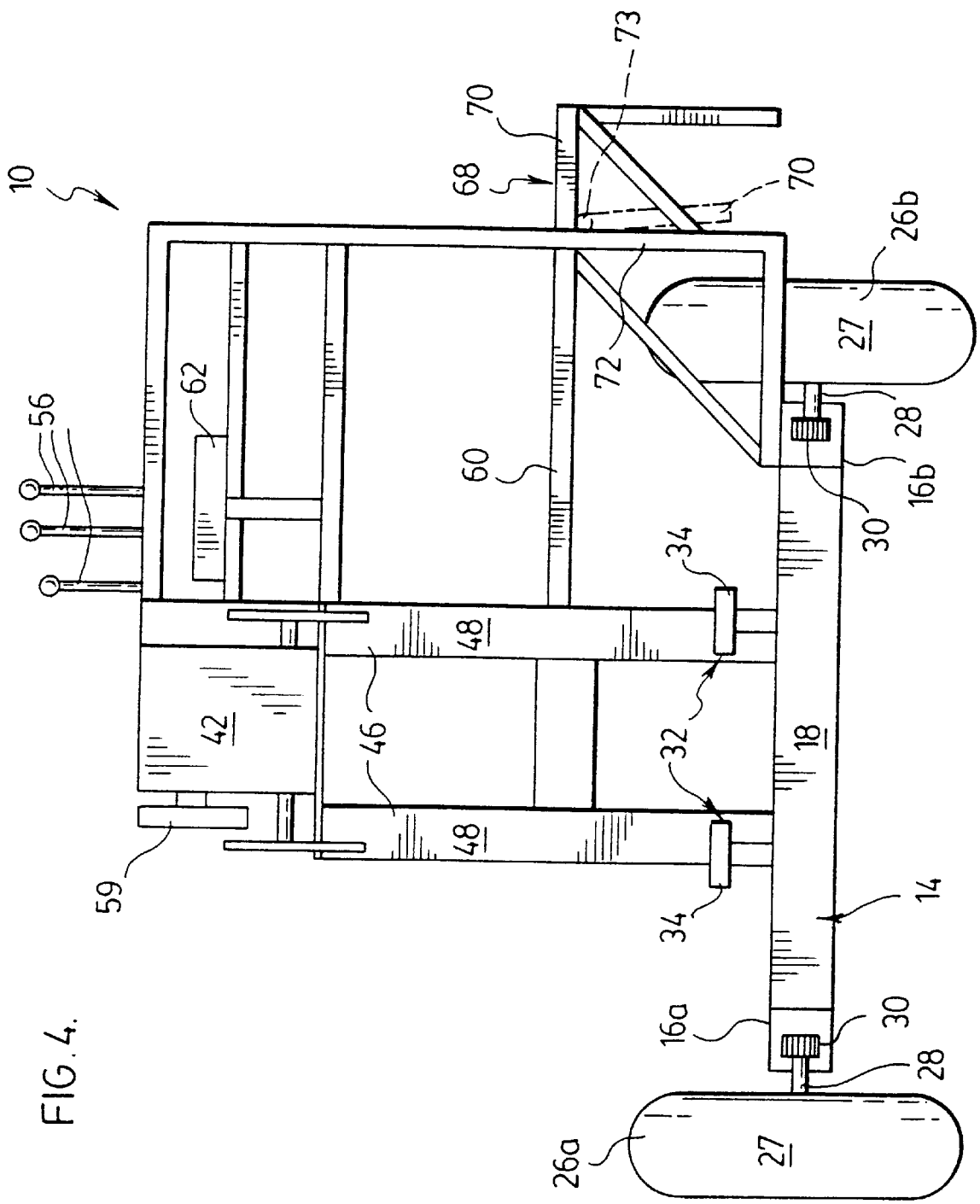
FIG. 4 shows an enlarged schematic rear end view of the boat launch vehicle of FIG. 2.

The launch vehicle 10 includes a partially submersible generally planar aluminum or galvanized steel frame 14. The frame 14 is elongated in a longitudinal direction and has an overall length of up to 8 meters and lateral width of up to 3 meters to enable the boat 12 to be supported or trailered thereon. FIG. 3 shows best the frame 14 as being generally symmetrical about a longitudinal center axis A–$A_1$. The frame 14 is formed from a pair of sealed hollow rectangular left and right side rails 16a,16b which are provided in parallel to each other and joined by a number of longitudinally spaced cross braces 18.

In the embodiment shown, the frame 14 is movably supported on an opposing pair of left and right front wheels 20a,20b and three opposing, pairs of left and right rear wheels 22a,22b, 24a,24b and 26a,26b. Each wheel 20,22, 24,26 includes a rubber tire 27, an axle 28 (FIG. 3), a hub 29 mounted to an outboard end of the axle 28. The rubber tires 27 are selected to enable the vehicle 10 to move over sand or soft and uneven terrain without becoming bogged down. To minimize the buoyancy of the vehicle 10 and provide better weight distribution, the tires 27 are most preferably, wide profile low pressure tires which are inflated to a pressure of 25 psi or less and preferably 5 psi or less, such as those which are used on ATV's or Argo™ amphibious vehicles. Alternately, the wheels may be weighted with sand, gravel, calcium or other suitable material for increased negative buoyancy. The tires 27 preferably also have a tread diameter of at least about 25 cm and a radial diameter of at least 30 cm, and more preferably between 30 and 60 cm to enable the movement of the vehicle 10 over rocks and uneven terrain. Suitable tires include the Goodyear Runamuk™ 22x10.00-8NHS and the Goodyear Rawhide III 25x12.00-9NHS (inflated to 2.1 psi or 0.67 psi when used with tracks). Each of the wheels 20a,22a,24a,26a and 20b, 22b,24b,26b is rotatably mounted to a respective side rail 16a, 16b by means of its corresponding axle 28. The axles 28 extend into the side rail 16a,16b so as to form a rotary seal therewith to prevent the movement of water into the interior of the side rail 16a, 16b while the launch vehicle 10 is partially submerged during boat launching and/or docking. A metal pinion 30 (FIG. 3) is mounted to an inboard end of the axle 28 used to mount each of the rear wheels 22a,22b,24a,24b,26a and 26b. As will be described hereafter, the pinion 30 is provided on the inboard end of the axles 28 of wheels 22,24,26 so as to locate within the hollow interior of the side rails 16a,16b. The pinion 30 is directly coupled to the axle 28 and has a radial diameter selected to permit its free rotational movement therewith within the interior of the rails 16a,16b.

A boat crib or bunk 32 is secured towards a rear end of the frame 14. The boat bunk 32 consists of a pair of neoprene covered aluminum rails 34 which are welded to the rearmost cross braces 18. As seen best in FIGS. 1 and 2, the rails 34 extend a marginal distance above the frame 14 and have a height and a spacing selected to engagedly support the bottom side portions of the boat hull 36 (FIG. 1), so that the boat 12 may be trailered thereon without interfering with the rotation of the wheels 20,22,24,26. In this regard, the bunk rails 34 are provided in parallel and extend preferably less than 40 cm above the frame 14. The height of the rails 34 is also selected so as to assume a submerged position during boat launching and docking, so as not to interfere with the free movement of the boat 12 onto and off of the boat bunk 32. The rails 34 are spaced apart from each other so as to maintain the boat 12 in a position mounted on the frame 14 during boat transport while not interfering with the boat propeller (not shown) during boat launching and/or docking. As will be described, with this configuration, when the rear end of the vehicle 10 is submerged into the lake, the boat 12 will float freely above the bunk rails 34. While FIGS. 1 to 4 illustrate the boat bunk 32 as consisting of a pair of neoprene rails 34, it is to be appreciated that other boat bunk configurations including rubber or neoprene rollers or carpeted bunk rails could also be used.

Figure 5:
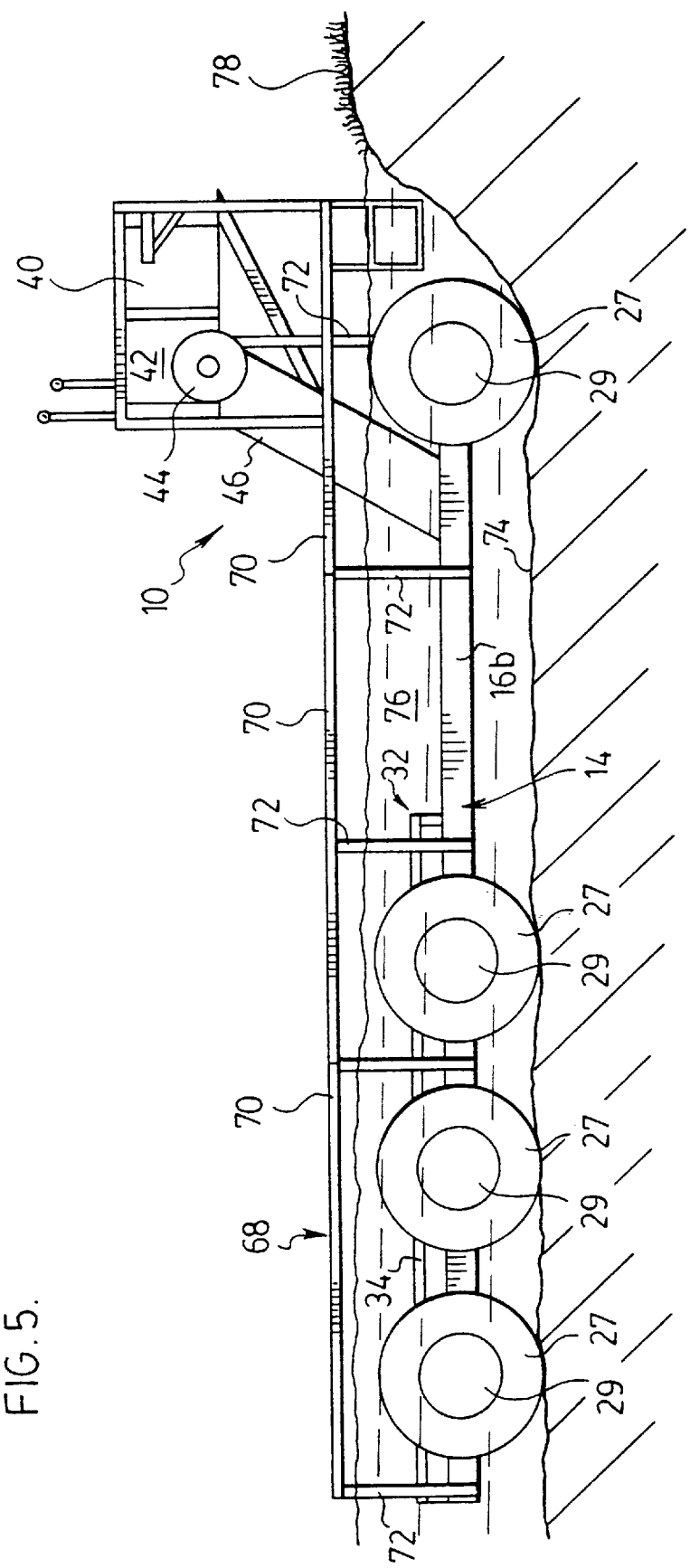
FIG. 5 shows a schematic side view of the boat launch vehicle shown in FIG. 2 in a partially submerged position and functioning as a seasonal dock.

FIGS. 1 to 3 show best the vehicle 10 as being adapted to be driven in movement by a motor 40 which selectively provides power to each of the left wheels 22a,24a,26a and right wheels 22b, 24b, 26b, by means of a clutch assembly 42 and drive linkage 44. The motor consists of a 12 to 24 horsepower gasoline engine which is mounted on an uppermost end of vertically extending motor supports 46 secured to a forward portion of the frame 14. The supports 46 are secured to a support base 47 (FIG. 3) which spans between and is joined in each of the side rails 16a,16b. The supports 46 extend upwardly from its base 47 at an angle of between about 0 and 60° from vertical, and more preferably about 30° from vertical in a direction away from the rear end of the launch vehicle 10. The supports 46 have a length of between 2 and 5 feet, depending upon the overall size of the boat 12 which is to be trailered. The length of the supports 46 is selected to enable the boat bunk 32 to be sufficiently submerged to permit the boat 12 to be floated free from the vehicle 10 during boat launching or docking while maintaining the motor 40 above the water. It is to be appreciated that by positioning the motor 40 on the supports 46, the lower portion of the frame 14 and boat bunk 32 may be lowered into a lake 76 (FIG. 5) and submerged sufficiently to enable the boat 12 to float free thereof, while maintaining the motor 40 above the water and adjacent to the bank 78 (FIG. 5).

Each support 46 is formed having hollow interior 48. As seen best in FIG. 3 the drive linkage 44 consists of left and right drive chains 50a,50b, two independently rotatable left and right drive shafts 52a,52b and left and right shaft chain drives 54a,54b. The shaft chain drives 54a,54b extend along the hollow interior 48 of the supports 46 to connect the motor 40 to a respective drive shaft 52a,52b. The left and right drive shafts 52a,52b are rotatably positioned and sealed within the hollow interior of the support base 47 and extend into the hollow interior of each side rail 16a, 16b, respectively. The drive chains 50a,50b extend along the interior of the side rails 16a,16b from the drive shafts 52a,52b to engage the pinions 30 associated with each rear wheels 22a,24a,26a and 22b,24b,26b, respectively. The side rails 16a, 16b are formed as closed tubes with the result that the drive chains 50a,50b are sealed from lake water for prolonged life span.

The clutch assembly 42 is operable by means of controls 56 to provide forward or reverse power to the chain drives 54a,54b either together or independently to selectively rotate the rear wheels 22,24,26 and propel the boat launch vehicle 10 while permitting skid steering.

Although not essential, the preferred embodiment of the invention shown in FIGS. 1 and 3 illustrates the launch vehicle 10 as further including a winch 59 mounted adjacent the motor 40 to assist in launching and retrieving the boat 12, as well as an operator platform 60 and seat 62 upon which a user may rest during the transport and launching of the boat 12. It is to be appreciated that in a more economical embodiment, the platform 60 and seat 62 may be omitted and the vehicle 10 used with a user operating the controls 56 while walking.

FIGS. 2 and 3 show best the boat launch vehicle 10 as further including a walkway 68 secured to the frame 14. Where longer frames 14 are to be used, the walkway is preferably formed from a number of longitudinally aligned aluminum panel segments 70 and extends substantially the longitudinal length of the boat launch vehicle 10. The walkway 68 has a lateral width selected to enable a user to comfortably walk thereon when entering and exiting from the boat 12. In this regard, the walkway has a lateral width of at least one foot and more preferably between about 2 and 6 feet. FIG. 3 illustrates best the walkway 68 in an operative position, extending generally horizontally along one longitudinal side of the vehicle 10. It is to be appreciated that the walkway 68 is positioned so as to not interfere with the movement of the boat 12 to and from a position over the boat bunk 32. The walkway is shown best in FIG. 2 as being secured to a number of vertical supports 72. The walkway 68 is mounted on the supports by hinges 73 (FIG. 4) so as to be movable between a horizontal position which enables the launch vehicle 10 to function as a temporary dock in the manner shown in FIG. 5, and an inclined or vertical orientation (shown in phantom in FIG. 4) when, for example, tile boat 12 is resting on the bunk 32 for transport or storage. The segments 70 are coupled to the support 72 so as to be pivotal about the hinges 73 from the inclined or generally vertical orientation for boat storage and transport, and the horizontal orientation shown in FIG. 3.

FIG. 5 shows the positioning of the boat launch vehicle 10 in a partially submerged orientation resting on the bed 74 of a lake 76. To transport and launch the boat 12, the motor 40 is started. The clutch assembly 42 is then used to selectively engage the drive chains 54a,54b to rotate drive shafts 52a,52b and chain drives 50a,50b. In forward and reverse movement, chain drives 50a,50b are operated concurrently in the same direction. To steer the launch vehicle 10, the chain drives 50a,50b are operated either independently, while braking the opposing drive to provide skid steering. To launch a boat 12 stored on the boat bunk 32, the user operates the controls 56 to drive the wheels 22,24,26 and back the rear end of the frame 12 into the lake 76. As the vehicle 10 moves into the lake 76, the wheels 20,22,24,26 submerge and move over the lake bed 74. The wider ATV-type tires 27 advantageously ensure that the wheels 20,22,24,26 will travel over the lake bed 74 and any debris which has settled thereon, and the vehicle 10 will not become mired in lake bed sediments and the like. The wide tire profiles provide the rear drive wheels 22,24,26 better traction over the lake bed 74 and softer terrain. As the vehicle moves off the bank 78 and into the lake 76, the boat bunk 32 is submerged to a position such that the boat 12 may be floated free of the vehicle 10.

With the launch vehicle 10 in the partially submerged configuration, the walkway 68 assumes an orientation substantially above the surface of the lake 76. The launch vehicle 10 may be used to daily launch and retrieve the boat 12 from the lake 76, thereby protecting it from wake action, corrosion and algae. Alternately, the walkway allows the vehicle 10 to be left in the partially submerged position shown in FIG. 5 to function as a temporary dock. In particular, the boat 12 may be moored over the boat bunk 32 and access to and from the boat 12 may be achieved via the walkway 68. Either at the end of each day, upon the onset of severe weather or at the end of the season, the boat 12 is again floated over the neoprene rails 34 and tethered in position. The motor 40 is then activated to drive the launch vehicle 10, together with the boat 12 from the lake 76 for storage elsewhere.

Figure 6:
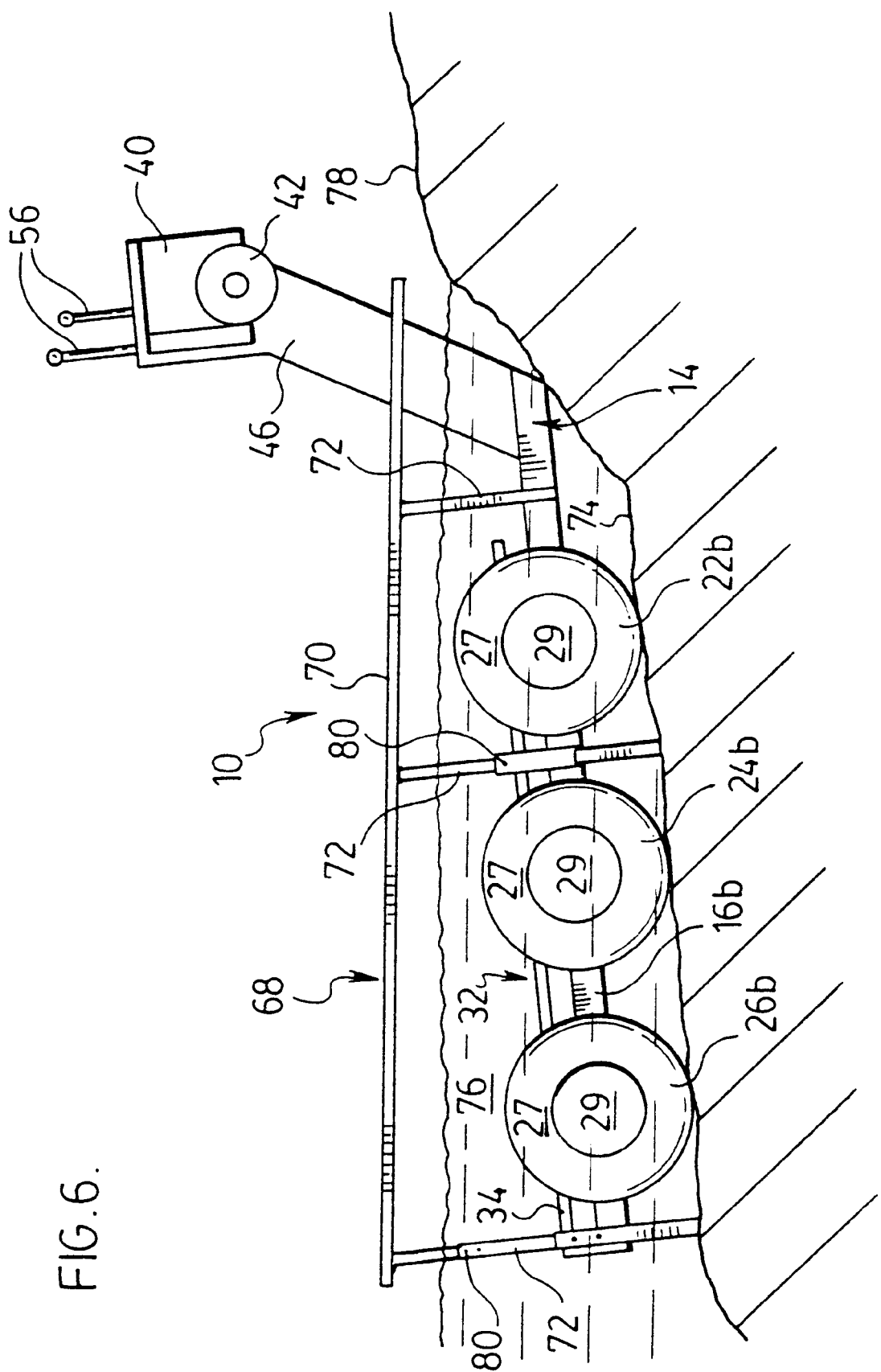
FIG. 6 shows a schematic side view of a boat launch vehicle in accordance with a second embodiment of the invention.

FIG. 5 illustrates the walkway 68 as consisting of a number of planar segments 70 mounted to fixed vertical supports 72, however, the invention is not so limited. FIG. 6 illustrates a further embodiment of the invention wherein like reference numerals are used to identify like components. In FIG. 6, a single walkway segment 70 is secured to telescoping supports 72 which, depending on the desired configuration, may be extended up to 2 meters above the boat bunk 32. The telescoping supports 72 advantageously provide the launch vehicle 10 with greater flexibility with respect to its use where the lake bed 74 may slope more dramatically. In particular, where increased lake bed slope is encountered, the vertical supports 72 may be telescopically moved to the extended position shown. The Supports 72 may then be locked in place by inserting pins 80 through a series of aligned holes in the telescoped sections. In the embodiment shown in FIG. 6, the supports 72 are also adapted for telescoping movement downward to engage the lake bed 74, to assist in anchoring the vehicle 10 as a dock against wave and current action.

In FIG. 6, the launch vehicle is adapted for self-propulsion by means of a gas motor 40 operated by a user while walking. As with the embodiment shown in FIG. 1, the motor 40 is mounted upon the support 46 which extends upwardly from the frame 14 at an angle of between about 20° and 40° from vertical. The length of the support 46 is selected to maintain the motor 40 in a position spaced above the water surface and adjacent to the lake bank 78 while the bunk 32 remains submerged.

The preferred embodiment of the invention illustrates the launch vehicle 10 as being self-propelled by four pairs of wheels 20,22,24,26. It is to be appreciated that the wheel configuration is not so limited and more or fewer wheels could be provided. For example, where the launch vehicle 10 is to be used to launch smaller watercraft, the frame 14 may be shortened and the number of driven wheels can be reduced accordingly.

Figure 7:
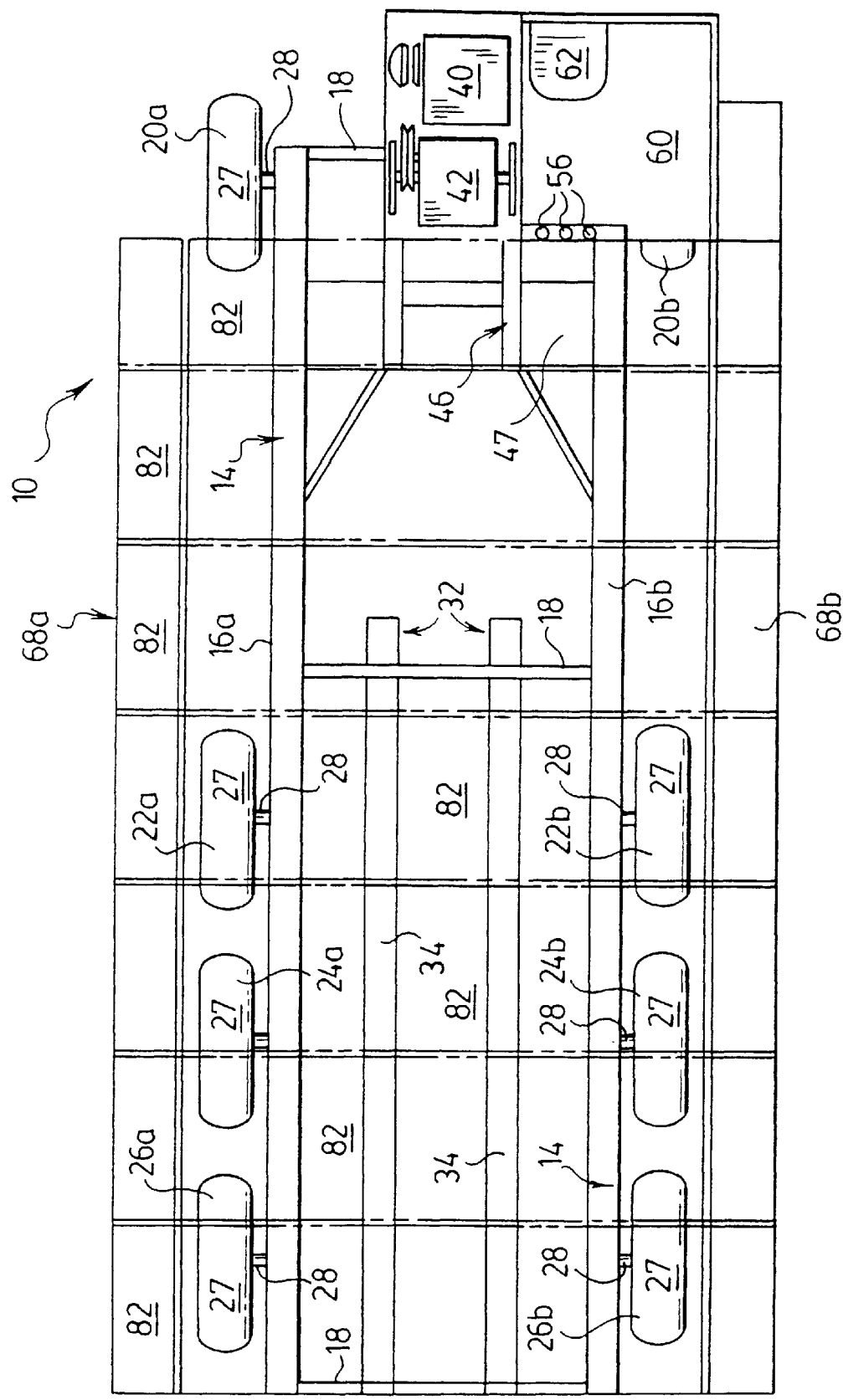
FIG. 7 shows a schematic top view of a boat launch vehicle in accordance with a third embodiment of the present invention.

The walkway 68 of FIG. 6 consists of a one to two foot wide deck which may, for example, be made from aluminum, galvanized steel, plastic or other suitable material, and which extends longitudinally along the length of one side of the frame 12. Alternately, if a wider dock is desired, walkways could be provided along both sides of the frame 14 and which are adapted to be either covered with a dock platform or pivoted together into a horizontal position to form a wider combined platform. FIG. 7 shows a plan view of an alternate embodiment of the invention in which like reference numerals are used to identify like components. In FIG. 7, the launch vehicle 10 is provided with left and right walkways 68a,68b which extend along each longitudinal side of the frame 14. Once the launch vehicle 10 is moved to the partially submerged position as shown in FIG. 5 and the boat 12 is floated free of the bunk 32, the launch vehicle 10 may be transformed to a seasonal dock. A number of laterally extending aluminum panels 82 are positioned straddling laterally across the vehicle 10 with each end resting respectively on a walkway 68a,68b. It is to be appreciated that with the use of the panels 82, the boat 12 would be moored in position either across the rearmost end of the launch vehicle 10, or along the outboard side of either walkway 68a,68b.

Figure 8:
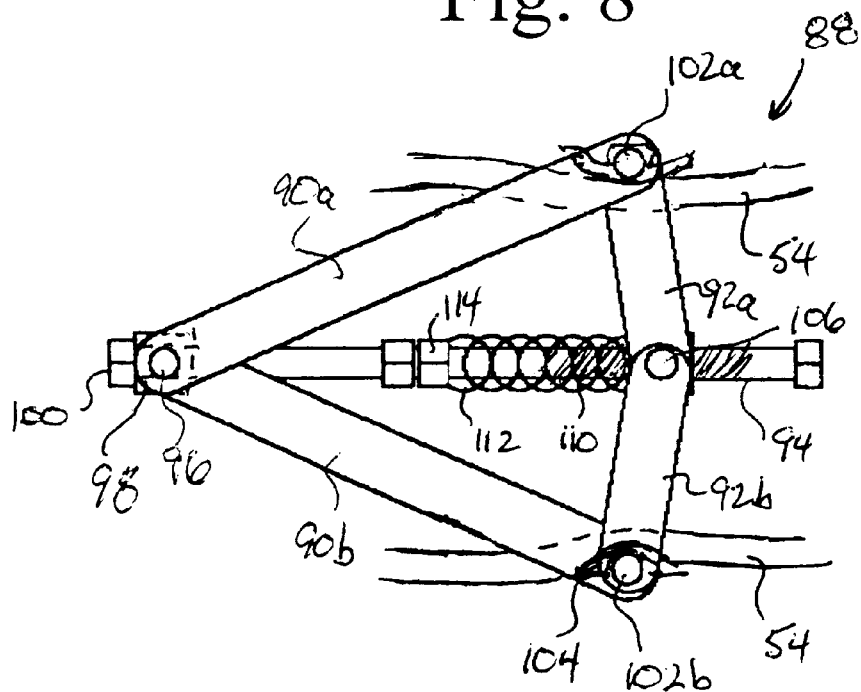
FIG. 8 shows a side view of a chain tensioner for use with the boat launch vehicle shown in FIGS. 1, 6 and 7.
Figure 9:
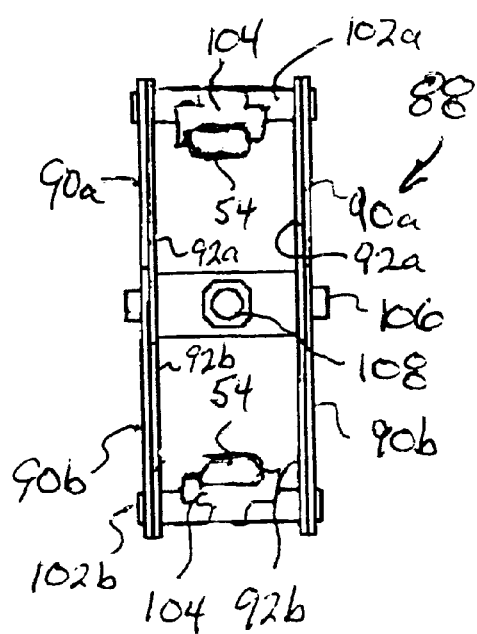
FIG. 9 shows a perspective end view of the chain tensioner of FIG. 8.

Reference may be had to FIGS. 8 and 9 which illustrate a preferred chain tensioner 88 used to maintain the drive chains 54 under the desired tension. The tensioner 88 consists of two pairs of parallel arranged swing arms 90a, 90b, two pairs of parallel spaced calming arms 92a,92b and a threaded central shaft 94. The pairs of swing arms 90a are pivotally coupled at one end to the swing arms 90b by a pivot bar 96. In addition to maintaining the desired spacing between the pairs of swing arms 90a,90b, the pivot bar 96 includes a centrally disposed bore 98 which is sized to permit free rotational movement of the threaded shaft 94 therein while preventing movement of the shaft head 100 therethrough.

FIG. 9 shows best the pairs of calming arms 92a,92b as being pivotally coupled at a respective end to the second other ends of the swing arms 90a,90b, with the desired spacing therebetween being maintained by a nylon pin 102a,102b. As will be described, a nylon bushing on guide 104 is secured about each of the pins 102a, 102b to facilitate free sliding movement of the drive chain 54 therepast. The opposing end of the ends of each associated pair of calming arms 92a,92b are pivotally joined to a second centrally disposed pivot bar 106 which, as shown best in FIG. 9, includes a threaded bore 108. The bore 108 has an internal thread configuration sized to threadedly engage external threads 110 provided along the shaft 94. A compression spring 112 is further provided axially over the portion of the shaft 94 which locates intermediate the pivot bar 106 and a boss 114 which is spaced towards the pivot bar 96.

It is to be appreciated that with the chain tensioner 88, the rotation of the shaft 94 results in the selective movement of the pivot bar 106 either towards or away from the pivot bar 96. As the pivot bar 106 is moved away from the pivot bar 96, the ends of the calming arms 92 which are coupled to the swing arms 94, are drawn inwardly supplying the desired degree of chain tension.

Figure 10A:
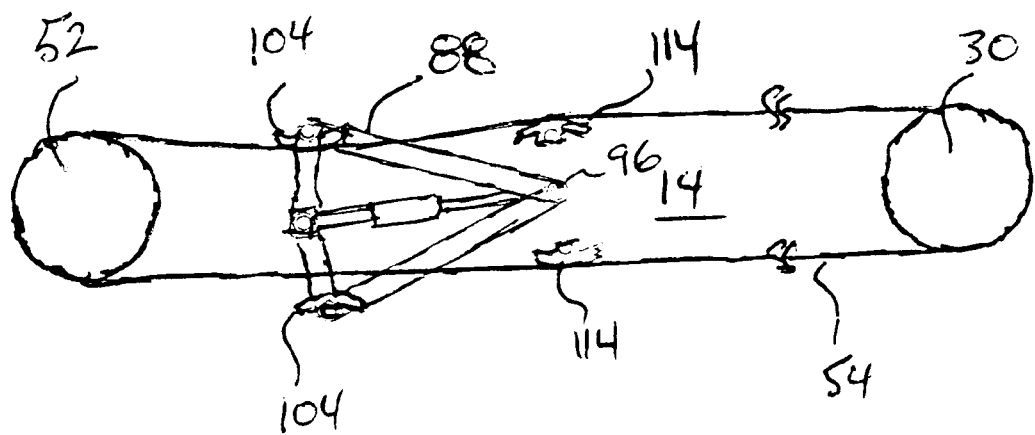
FIGS. 10a and 10b illustrate schematically the operation of the chain tensioner of FIGS. 8 and 9.
Figure 10B:
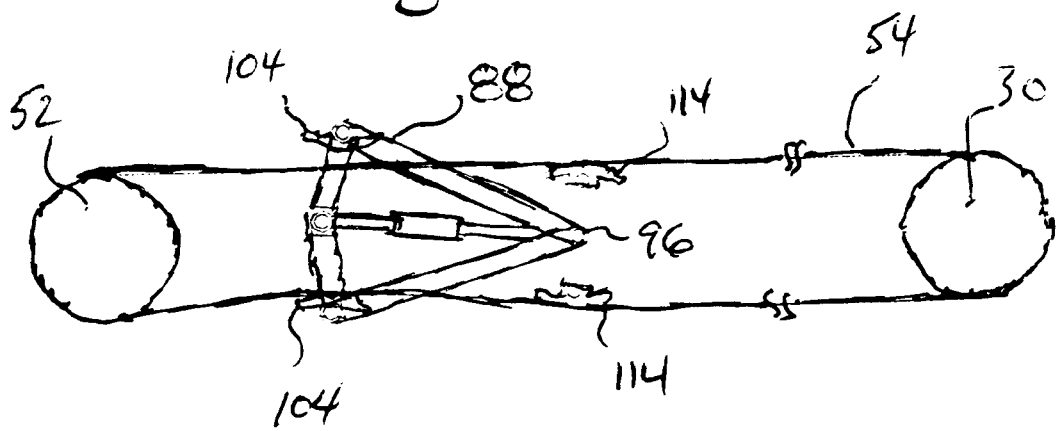

As seen best in FIGS. 10a and 10b, the chain tensioner 88 is pivotally secured to the frame 14 at a point adjacent the pivot bar 96. The drive chain 54 is looped through the tensioner 88 in the configuration shown in FIG. 8 so that the guides 104 may be used to apply tensioning pressure against the chain 54. Optionally, additional guides 114 may be provided along the frame 14 to further assist in chain movement. Because the tensioner 88 pivots about the bar 96 relative to the frame, the chain 54 may be effectively tightened regardless of whether or not the chain is driven in forward or reverse motion.

Although the embodiment of the invention illustrated in FIGS. 8 and 9 shows the chain 54 as running against the guides 104, it is to be appreciated that the invention is not so limited. If desired, rotatable toothed wheels or other bushings or guides could be provided on the pivot pins 102 or elsewhere to a assist in guiding movement of the chain 54 therepast.

Figure 11:
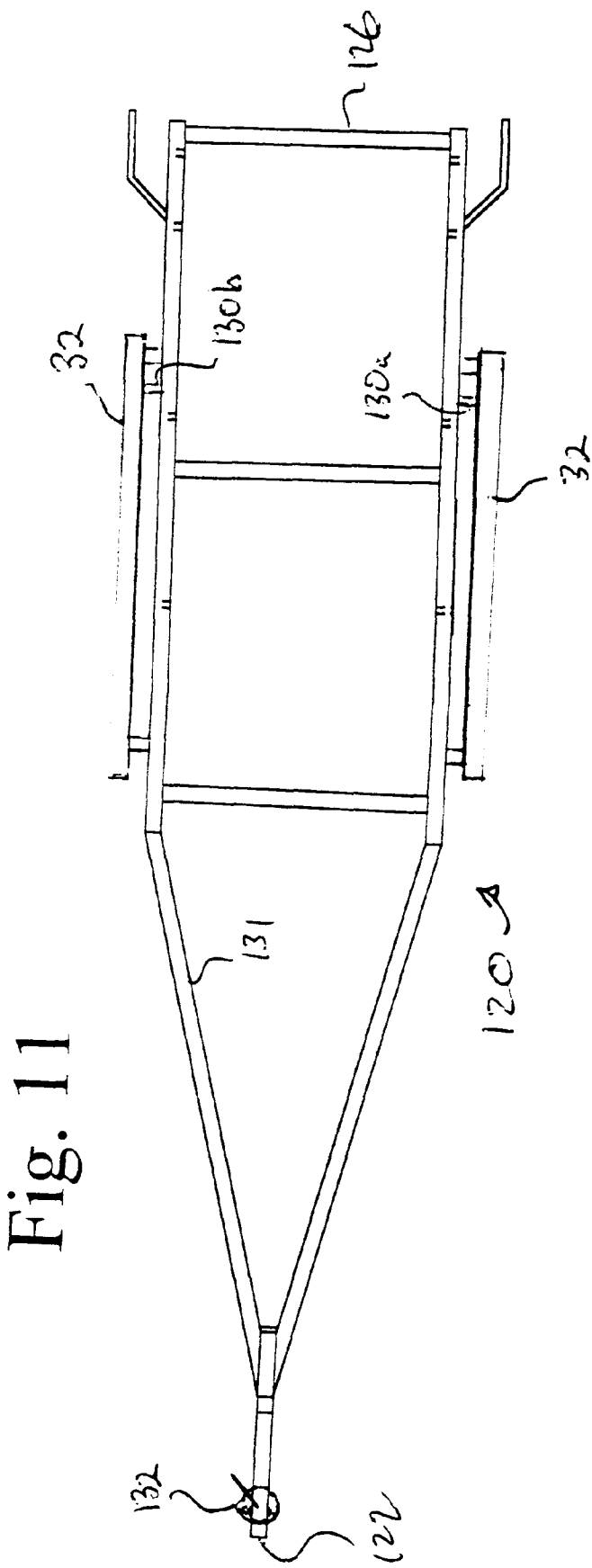
FIG. 11 shows a top view of a modified boat cradle for use with the launch vehicle of FIG. 1.
Figure 12:
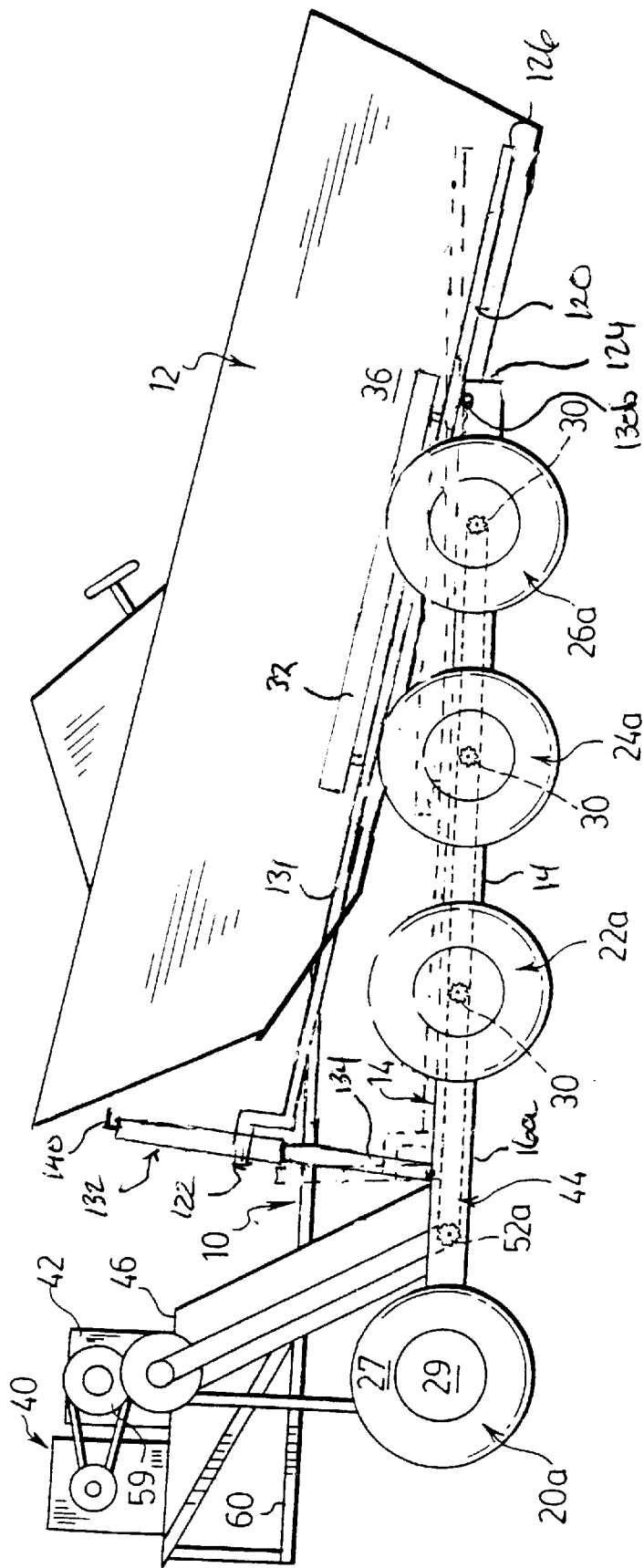
FIG. 12 shows schematically the boat cradle of FIG. 11 mounted to a launch vehicle frame.

Although FIG. 1 illustrates the launch vehicle 10 having a boat bunk 32 fixedly secured to the frame 14, the invention is not so limited. Reference may be had to FIGS. 11 and 12 which illustrate the boat bunk 32 mounted to a tipping cradle 120. FIG. 12 shows the tipping cradle 120 as being pivotally mounted to the frame 14, and wherein like reference numerals are used to identify like components. The cradle 120 consists of a jack 126 and a cradle frame 131 which supports the bunk 32. Although not essential, the tipping cradle frame 131 extends from a forwardmost end 122 a distance rearwardly past the rearwardmost end 124 of the frame 14 (FIG. 12) to rear end 126. The tipping cradle 120 is pivotally coupled to a respective side rail 16a, 16b of the frame 14 by associated stainless steel pivot pins 130a, 130b.

A jack 132 is provided at the forwardmost end 122 to selectively pivot the cradle 120 about the pins 130a,130b to raise and lowered the forwardmost end 122. The jack 132 consists of a hollow tube 136, and most preferably is located adjacent the support 46. A jack post 138 is telescopically received with in a bottom open end of the tube 136. A manual handle 140 or optional power crank (not shown) is used to selectively raise or lower the jack post 138 relative to the tube 136. The end of the jack post 168 is hingely coupled to the frame 14. It is to be appreciated, however, that the jack 132 could be mounted in the opposite configuration with the jack tube 136 secured to the launch vehicle frame 14, and the jack post 134 hingely coupled to the metal frame 131 of the cradle 120.

To selectively tilt the cradle 120, the jack post 138 may be lowered vertically from the tube 136. By lowering the post 138 to pivot the cradle frame 131 about the pins 122a, 122b, lowering, the rearward end 126. This position advantageously perm-its easier launching, and retrieval of the boat on to and off of the cradle 120. Once the boat is positioned over the cradle, for increased ground clearance at the end 126, the jack post 138 may be moved into the tube 132, with the tube 132 moving downwardly thereon. This lowers the forward cost end 122 of the cradle 120 and raises its rearwardmost end 126. It is to be appreciated that once the cradle frame 131 is in the desired position, the jack 132 secures the frame 131 in place.

While the preferred embodiment of the invention illustrates the launch vehicle as having a pair of front wheels 20 which are not driven by the motor 40, the invention is not so limited. If desired, the drive linkage could extend to one or both of the front wheels 20a,20b.

Figure 13:
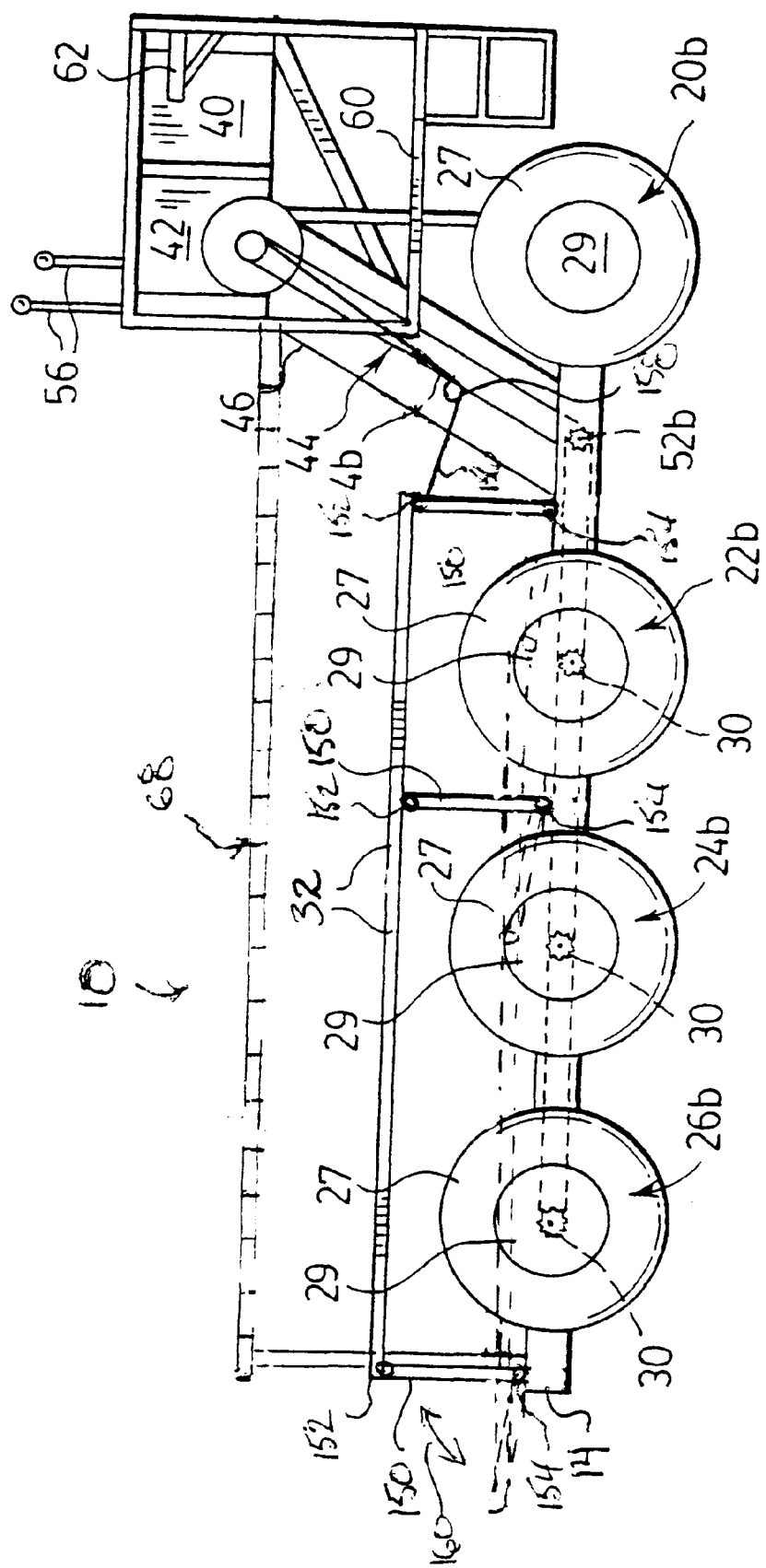
FIG. 13 illustrates schematically a boat launch vehicle in accordance with a further aspect of the invention.

While FIGS. 11 and 12 illustrate a tipping cradle 120 used to assist in the launching of a boat 12, the invention is not so limited. FIG. 13 illustrates a further embodiment of the invention wherein life reference numerals are used to identify like components. In FIG. 13, the boat bunk 32 itself is secured to a series of pivoting support members 150. The support members 150 are hingely coupled at one end to the boat bunk 32 by a respective hinge coupling 152 and at their other opposite end, are coupled to the frame 14 by a hinge coupling 154. Aircraft cable is secured at one end to an upper portion of a first support 150. The aircraft cable 156 is fed via a pulley 158 to the clutch assembly 42 of the drive motor 40.

The operation of the clutch assembly 42 enables the tensioning of the cable 156 selectively moves the boat bunk 32 in the direction of arrow 160 between the boat supporting position shown and the position shown in phantom in FIG. 13. This movement advantageously facilitates the launching and retrieval of a boat 12.

While vertical adjustment of the horizontal walkway 68 is preferred as providing the maximum adaptability of the vehicle 10 for differing lake bottom conditions, the invention is not so limited. Similarly, while the preferred embodiment of the invention discloses the walkway 68 as being pivotally movable between a collapsed inclined or generally vertical orientation, and a horizontal operating position, it is to be appreciated that in a more economical embodiment the walkway 68 is permanently mounted in the horizontal orientation.

While the detailed description of the preferred embodiments describes the boat launch vehicle as being self-propelled, the launch vehicle 10 could be unpowered for towing by vehicles including by way of non-limiting example, all-terrain vehicles (ATV's), Argo™ amphibious vehicles, trucks, automobiles, lawn tractors or the like.

While the detailed description describes the present invention as a boat launch vehicle, it is to be appreciated that the invention is adapted for use with numerous types of watercraft. In particular, the present invention is adapted not only for use in transporting and launching smaller power boats having a length less than about 35 feet, but also other personal watercraft including Seadoos™, sailboats, paddle boats or the like.

Although the detailed description describes and illustrates various preferred embodiments of the invention, the invention is not so limited. Many modifications and variations will now occur to persons skilled in the art. For a definition of the invention, reference may now be had to the appended claims.

I claim:

1. A self-propelled boat launch vehicle for launching or docking a boat in water comprising,
    a submersible longitudinally elongated frame, said frame being movably supported on each longitudinal side by a pair of low pressure tires inflated to a pressure of 25 psi or less,
    a submersible boat bunk mounted to said frame for supportably engaging said boat during launching,
    a drive motor supported at a position spaced vertically above said boat bunk, whereby during launching or docking of said boat, said drive motor is maintained at a position substantially above said water,
    a continuous-loop drive member connecting said drive motor and at least one of said wheels, whereby the activation of the drive motor drives said at least one of said wheels to move the boat launch vehicle, and
    a walkway for supporting a user thereon being coupled to the frame.

2. A boat launch vehicle as claimed in claim 1 further including a tensioner for maintaining a desired tension of said drive member, said tensioner comprising,
    a pair of elongated swing arm members being hingely coupled towards a first end by a pivot,
    a bearing member secured to the second other end of each of said arm members for engaging said drive chain, and
    an actuating assembly for selectively moving said swing arm members to move at least one of said bearing members into bearing contact with said drive member in a direction which is non-linear to the direction in which said drive member is driven.

3. A boat launch vehicle as claimed in claim 2 wherein said tensioner is pivotally coupled to said frame at a pivot spaced towards the first end of said swing arm members.

4. A boat launch vehicle as claimed in claim 3 wherein said walkway is formed as a plurality of planar deck segments.

5. A boat launch vehicle as claimed in claim 3 further including a linkage housing, said drive member comprising a drive chain extending in said linkage housing, wherein said linkage housing substantially isolates said drive chain from said water.

6. A boat launch vehicle as claimed in claim 5 wherein said drive linkage is connected to each of said wheels, said vehicle further including a clutch mechanism for independently controlling the rotation of the wheels to drive said boat launch.

7. A boat launch vehicle as claimed in claim 6 wherein said boat bunk comprises a pair of spaced apart rails.

8. A boat launch vehicle as claimed in claim 3 wherein said walkway comprises a planar support hingedly mounted to said frame, said planar support being pivotally movable between a generally horizontal orientation and an inclined storage orientation.

9. A boat launch vehicle as claimed in claim 2 wherein each longitudinal side of said frame comprises a tubular aluminum rail having a hollow interior, said rails being coupled to each other by a plurality of cross-brace members, said drive member including a drive chain extending along the hollow interior of each of said rails and being substantially isolated from said water thereby.

10. A boat launch vehicle as claimed in claim 6 wherein said low pressure tires are inflated to a pressure of 5 psi or less.

11. A boat launch vehicle as claimed in claim 9 further including a winch mounted adjacent said drive motor to assist in launching said boat.

12. A self-propelled boat launch vehicle for transporting, launching or docking a boat in water comprising,
    a partially submersible longitudinally elongated frame,
    a submersible boat bunk mounted to said frame for supportably engaging said boat during transport or launching,
    a low pressure tire inflated to a pressure of 25 psi or less rotatably mounted to each side of said frame,
    a drive motor supported at a position vertically above said boat bunk such that when said boat bunk is submerged sufficiently to enable the boat to float free of the bunk, said drive motor is substantially maintained at a position above said water,
    a drive linkage independently connecting said drive motor and said wheels, whereby the activation of the drive motor drives the boat launch vehicle in movement, and
    a generally planar walkway for supporting a user thereon extending substantially the longitudinal length of the frame, said walkway being coupled to said frame such that when said boat bunk is submerged sufficiently to enable the boat to float free of the bunk, the walkway is maintained in a position substantially above said water.

13. A boat launch vehicle as claimed in claim 12 wherein each longitudinal side of said frame comprises a tubular rail having a hollow interior, said drive linkage including a drive chain extending along the hollow interior of a portion of each said rail and substantially isolated from said water thereby, and a tensioner for maintaining a desired tension of said drive chain, said tensioner comprising, a pair of elongated swing arm members being hingely coupled towards a first end by a pivot, a bearing member secured to the second other end of each of said arm members for engaging said drive chain, and an actuating assembly for selectively moving said swing arm members to move at least one of said bearing members into bearing contact with said drive chain in a direction which is non-linear to the direction in which said drive chain is driven.

14. A boat launch vehicle as claimed in claim 13 wherein said walkway is formed from plurality of planar deck segments.

15. A boat launch vehicle as claimed in claim 12 wherein said drive linkage comprises a linkage housing and a drive chain extending in said linkage housing, said linkage housing substantially isolating said drive chain from said water.

16. A boat launch vehicle as claimed in claim 13 wherein said tensioner is pivotally coupled to said frame at a pivot spaced towards the first end of said swing arm members.

17. A boat launch vehicle as claimed in claim 13 wherein said drive linkage further includes a clutch mechanism for independently controlling the rotation of the wheels to drive said boat launch.

18. A boat launch vehicle as claimed in claim 13 wherein said boat bunk is pivotally coupled to said frame whereby a forward end of said boat bunk is movable between a first position raised relative to said frame, and a second lowered position moved theretowards, said boat launch vehicle further comprising an actuating mechanism for selectively moving said boat bunk between said first and second positions.

19. A boat launch vehicle as claimed in claim 18 wherein said low pressure tires are inflated to a pressure of 5 psi or less.

20. A boat launch vehicle for transporting, launching or docking a boat in water comprising, a generally planar frame, a submersible boat bunk mounted to said frame, and configured to engage and support said boat thereon during transport, said boat bunk including a pair of generally parallel and longitudinally extending side rails each extending from a first end to a second end, and wherein said side rails are pivotally coupled to said frame at a pivot so as to permit the second end of each of said rails to be lowered relative to said first end, a pair of low pressure tires movably supporting said frame, each said tire being inflatable to a pressure of 5 psi or less and being coupled to a respective longitudinal side rail of said frame, a drive motor selectively operable to drive said tires, said motor being supported at a position spaced a distance vertically above said boat bunk such that when said boat bunk is submerged during launching or docking of said boat, said drive motor is substantially maintained at a position above said water.

21. A boat launch vehicle as claimed in any one of claims 20 further comprising a bot cradle, wherein said submersible boat bunk being mounted to said cradle, said cradle being movably mounted to said frame so as to pivot about a generally horizontal axis between a loading position wherein a forward end of the boat cradle is raised relative to the frame and a rearward end of the boat cradle, and a transport position wherein the forward end is moved lower relative to said frame, said vehicle further including a positioning apparatus for selectively moving said boat cradle between said loading and transport positions.

22. A boat launch vehicle as claimed in claim 21 wherein said boat cradle extends in a direction rearwardly a distance past said frame.

* * * * *